US009189918B1

(12) United States Patent
Gronkowski et al.

(10) Patent No.: US 9,189,918 B1
(45) Date of Patent: Nov. 17, 2015

(54) CAMERA FOR PLAYER AUTHENTICATION AND MONITORING OF WAGERING GAME TABLES

(75) Inventors: Timothy T. Gronkowski, Chicago, IL (US); Timothy C. Loose, Chicago, IL (US); Scott A. Massing, Lincolnwood, IL (US); Victor T. Shi, Morton Grove, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 224 days.

(21) Appl. No.: 13/473,572

(22) Filed: May 16, 2012

Related U.S. Application Data

(60) Provisional application No. 61/487,117, filed on May 17, 2011.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .......... *G07F 17/3241* (2013.01); *G07F 17/322* (2013.01)

(58) Field of Classification Search
CPC ......... A63F 13/71; G06F 21/32; G06F 21/34; G06F 21/40; G06F 21/30; G07F 17/3206; G07F 17/3239; G07F 17/3241; G07F 17/322
USPC ...................................................... 463/12, 46
See application file for complete search history.

(56) References Cited

U.S. PATENT DOCUMENTS

2006/0160608 A1 7/2006 Hill et al.
2006/0252521 A1 11/2006 Gururajan et al.
2007/0111773 A1 5/2007 Gururajan et al.
2007/0142107 A1 6/2007 Kuhn et al.
2008/0076529 A1 3/2008 Richards et al.
2008/0113783 A1 5/2008 Czyzewski et al.
2008/0113787 A1 * 5/2008 Alderucci et al. .............. 463/29
2009/0118006 A1 5/2009 Kelly et al.
2009/0131146 A1 * 5/2009 Arezina et al. .................. 463/20
2009/0131151 A1 5/2009 Harris et al.
2009/0191933 A1 * 7/2009 French ............................ 463/12
2010/0004051 A1 1/2010 Walker et al.
2010/0255897 A1 10/2010 Pececnik
2012/0074646 A1 3/2012 Grauzer et al.
2012/0108337 A1 5/2012 Kelly et al.

* cited by examiner

*Primary Examiner* — Milap Shah
*Assistant Examiner* — Jason Pinheiro
(74) *Attorney, Agent, or Firm* — DeLizio Law, PLLC

(57) ABSTRACT

An apparatus includes a wagering game table having a sensory area configured to recognize a touch of a wagering game player and to create player touch data in response to the touch of the player. The wagering game table includes an input device configured to receive identification data that provides identification of the wagering game player. The apparatus includes a camera configured to capture an image during a time of the touch of the wagering game player at the sensory area of the wagering game table. The image comprising an image of at least part of the sensory area of the wagering game table and an image of at least part of the player. The apparatus includes an authentication module configured to define an association of the identification of the wagering game player with the at least one image of the at least part of the player.

30 Claims, 10 Drawing Sheets

CAMERA FOR PLAYER AUTHENTICATION AND MONITORING OF WAGERING GAME TABLES

RELATED APPLICATIONS

This application claims the priority benefit of U.S. Provisional Application Ser. No. 61/487,117 filed May 17, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to wagering game systems including cameras for player authentication and monitoring of wagering game play at wagering game tables.

BACKGROUND

Wagering game tables (e.g., black jack, roulette, baccarat, etc.) have been a cornerstone of the wagering game industry for many years. Electronic wagering game tables ((a.k.a. e-tables) can combine the best of traditional table games (e.g., black jack, roulette, baccarat, etc.) and wagering game machines because a live dealers can facilitate play while wagers are placed electronically through electronic wagering interfaces. An e-table provides an electronic wagering interface for players participating in a game. The electronic wagering interfaces present wagering options to the players and allow the players to place wagers. For example, an e-table configured for roulette comprises a roulette wheel and an array of electronic wagering interfaces that present the numbers to each player. A player places bets by selecting numbers using an input area (e.g., a group of buttons, a touch screen, etc.) on the electronic wagering interface, rather than placing chips on numbers on the table.

BRIEF DESCRIPTION OF THE FIGURES

Embodiments of the invention are illustrated in the Figures of the accompanying drawings in which.

DESCRIPTION OF THE EMBODIMENTS

Figure 1:
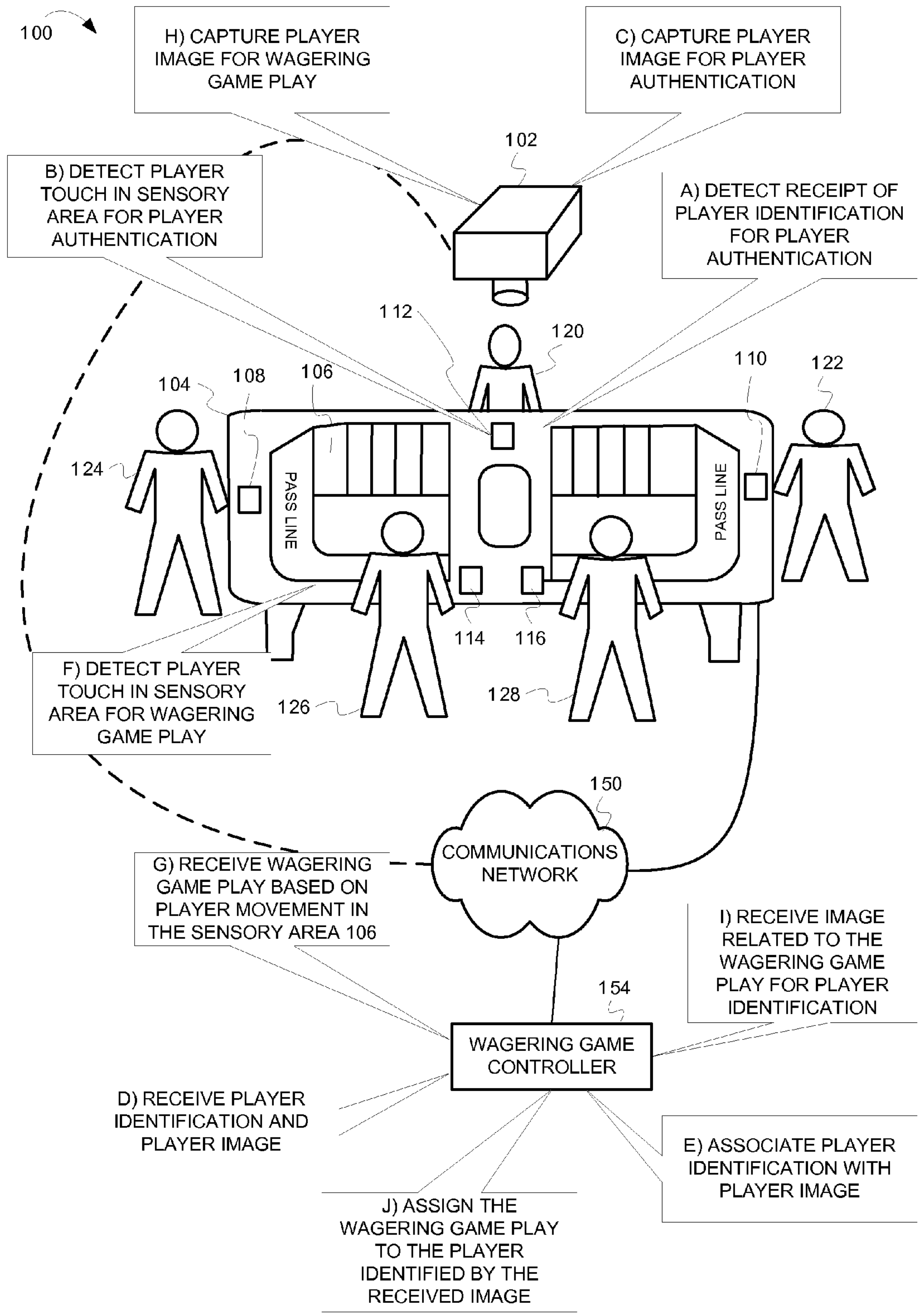
FIG. 1 depicts a system that includes a single camera that is positioned above a wagering game table for tracking player movement for both player authentication and player identification during wagering game play, according to some example embodiments.

This description of the embodiments is divided into five sections. The first section provides an introduction to some example embodiments, while the second section describes example system environments. The third section describes example operations performed by some example embodiments and the fourth section describes example wagering game system architectures in more detail. The fifth section presents some general comments.

Introduction

This section provides an introduction to some example embodiments. Some example embodiments use one or more cameras for authentication of wagering game players and for tracking wagering game play at wagering game tables (traditional table games (e.g., black jack, roulette, baccarat, etc.)). In some example embodiments, the cameras are three-dimensional, two-dimensional, etc. The cameras can be used in conjunction with one or more other player authentication devices (e.g., insertion of a player tracking or login card, key input devices, dongles, etc.) to authenticate the player. After the player has been identified through this authentication, the cameras can also be used to track the players' movements and activities on and around the game table. For example, the cameras can be used to determine that a player has moved to the opposite side of a game table and has made a wager after the initial player login. Embodiments can assign this wager to an account associated with the player based on the images captured by the multi-dimensional cameras. The cameras can capture video, still images, or a combination thereof. One or more images (relevant to player movement) can be located and extracted from video captured by the cameras. The depth-based images can then be distilled to a skeletal framework that simplifies and represents the player's position.

Therefore, after the initial player authentication, the player authentication devices are not needed to track the player movement. Specifically, the player is not required to remain at the location where they initialed logged in for wagering game play at the wager game table, but only within the field of view of the system's camera matrix. Also, some example embodiments can used for multi-touch electronic game tables, wherein one or more players can be touching the touch input screens of the game table at the same time. Such embodiments provide a freedom of movement of the player on and around the gaming table once the player authentication is complete. In particular, the player is not restricted to a particular area for game play on the game table. Also, if the player logged in through a player card, the player can remove the player card from the game table and continue play at the wagering game table. In particular, the cameras can then be used to track player movement. This recorded player movement can be used to determine the wagering game play of the player at the game table.

Some example embodiments allow for a communal area that multiple players can use for wagering game play. For example, embodiments allow for a communal area for roulette wherein multiple players can be placing chips for wagering in this communal area that includes the specific numbers, colors, even/odd, etc. This is in contrast to conventional electronic game tables wherein each player is provided with a designated area for their game play (that is separate from designated areas for game play by other players) so that the game play among the players can be determined. In particular, the cameras can be used to track wagering game play for multiple players in a same communal area.

The use of three dimensional cameras is especially useful for communal area gaming where players' arms are crossing each other as wagers are made (e.g., roulette). The images captured by three dimensional cameras can be used to determine which player's arm is performing a particular wagering game play because of the depth that is captured. The use of three-dimensional cameras can also be useful for table games wherein gesturing is a type of wagering game input. In particular, the three dimensional cameras can capture such gesturing for input into the wagering game. For example, the gesturing in blackjack wherein one hand gesture for holding can be differentiated over another hand gesture for asking for another card.

Player recognition can be through facial recognition, skeletal recognition, etc. For example, player recognition can be just based on the player's arms, hands, etc. In some example embodiments, the cameras are three-dimensional. Alternatively or in addition, some example embodiments can include two-dimensional cameras.

Some example embodiments can be used in electronic wagering game tables (a.k.a. e-tables), wherein the chips, cards, etc. are virtual. Alternatively or in addition, some example embodiments can be used in wagering game tables, wherein the chips, cards, etc. are real and can be tracked through various means (such as Radio Frequency Identification (RFID) tags, glyphs, Near Field Communication (NFC), etc.). Accordingly, the wagering game play using these chips, cards, etc. can be associated with a player based on their location on and around the game table using the tracking provided by the cameras, and supplemented by the location data from the tracking system for the chips, cards, etc.

Some example embodiments can use multiple cameras to capture different parts of the wagering game table and the players. The cameras can be at different heights and different positions in and around the wagering game table. These images from the multiple cameras can be stitched together to create an overall image for tracking player movement. The use of multiple cameras can be better than a single camera that can potentially produce images with distorted depths. Also, the stitching can be required because player movements can cross multiple camera views and to allow a clear camera view of players that may be behind other players in one camera's field of view, because players have the freedom to move around to any location around the wagering game table.

In some example embodiments, after the player authentication, the identification of the player (using the multiple dimensional cameras) can be tied to a touch by a player on the gaming table. For example, in response to a player touching the gaming table to place a virtual chip at a particular location, the system can determine the identification of this particular player based on the imagery captured. The touch data can be combined with the camera data to improve accuracy of the touch location beyond that which the camera data alone may not be able to determine.

While described such that the player authentication occurs at the wagering game table, in some other example embodiments, the player authentication can occur elsewhere. For example, a kiosk within a wagering game establishment, a computer at home, etc. can be used to perform the player authentication. To illustrate, assume that the player identification for wagering game play is based on facial recognition. The kiosk or computer (separate from the wagering game table) can include an input device configured to receive the player card or other player identifier. The kiosk or computer (separate from the wagering game table) can also include a camera. In response to the receipt of the player card, the camera can capture one or more images of the face of the player. These one or more images can be stored in a player database that can be accessed for subsequent comparison of images of the players at the wagering game table during a wagering game play. These comparisons are then used to assign the wagering game play to the wagering game player (as further described below).

System Environments

This section describes various system environments of some example embodiments. This section includes various configurations for cameras for tracking player authentication and player identification during wagering game play of wagering game players on game tables. The section will discuss FIGS. 1-6. The discussion of FIG. 1 will describe a system that includes one camera that is positioned above the wagering game table for tracking player movement for both player authentication and player identification during wagering game play. The discussion of FIG. 2 will describe one camera and a side of a wagering game table having a sensory area and an input device for player authentication. The discussion of FIG. 3 will describe a system that includes four cameras that are positioned above the wagering game table for tracking player movement for both player authentication and player identification during wagering game play. The discussion of FIG. 4 will describe a system that includes one camera that is positioned on the wagering game table at player level for tracking player movement for both player authentication and player identification during wagering game play. The discussion of FIG. 5 will describe a system that includes four cameras that are positioned on the wagering game table at player level for tracking player movement for both player authentication and player identification during wagering game play. The discussion of FIG. 6 will describe a system that includes four cameras that are positioned on the wagering game table at player level and one camera positioned above the game table for tracking player movement for both player authentication and player identification during wagering game play.

FIG. 1 depicts a system that includes a single camera that is positioned above a wagering game table for tracking player movement for both player authentication and player identification during wagering game play, according to some example embodiments. In particular, FIG. 1 depicts a system 100 that includes a wagering game table 104, a camera 102, a wagering game controller 154, and a communications network 150. The wagering game table 104, the camera 102, and the wagering game controller 154 are communicatively coupled together through the communications network 150. In some example embodiments, the wagering game controller 154 can be a part of the wagering game table 104. Also, in some example embodiments, the system 100 can include a number of wagering game tables that are communicatively coupled to the communications network 150, wherein the wagering game controller 154 can process player authentication and wagering game play from a number of players at each of the number of wagering game tables.

The wagering game table 104 includes a sensory area 106. The sensory area 106 can be across the entire top surface of the wagering game table 104. Alternatively, the sensory area 106 can be in those areas wherein player authentication and wagering game play occur. The sensory area 106 can be one or more scanners (e.g., infrared laser scanners), one or more cameras (e.g., infrared cameras), and/or other devices used for detecting player touches on the wagering game table 104. In some example embodiments, the sensory area 106 can include one or more of different technologies for detecting player touches (e.g., Fourier Transform Infrared Spectroscopy (FTIR), projected capacitive, etc.). The wagering game table 104 may also include processing hardware/software to process game event data and other information associated with the wagering table games and communicate with the wagering game controller 154 (as further described below).

In this example, the sensory area 106 includes a sensory area 108, a sensory area 110, a sensory area 112, a sensory area 114, and a sensory area 116. Each of the sensory area 108, the sensory area 110, the sensory area 112, the sensory area 114, and the sensory area 116 are at locations at the wagering game table 104 where a wagering game player can be authenticated for wagering game play. In some example embodiments, each of the sensory area 108, the sensory area 110, the sensory area 112, the sensory area 114, and the sensory area 116 are associated with an input device that is configured to receive player identification as part of a player authentication. An example of such a location is further described below in conjunction with FIG. 2.

Also shown in FIG. 1, there are a number of wagering game players—a wagering game player 120, a wagering game player 122, a wagering game player 124, a wagering game player 126, and a wagering game player 128. The wagering game player 120 is positioned in proximity to the sensory area 112. The wagering game player 122 is positioned in proximity to the sensory area 110. The wagering game player 124 is positioned in proximity to the sensory area 108. The wagering game player 126 is positioned in proximity to the sensory area 114. The wagering game player 128 is positioned in proximity to the sensory area 116. After player authentication, the wagering game players are allowed the freedom to move around the wagering game table 104. In other words, the player is not limited to a specific location during wagering game play. Accordingly, multiple wagering game players can be authenticated at a same location (e.g., the sensory area 112) at different times.

Various stages of example operations for a wagering game player are also shown in FIG. 1. Such operations are applicable for multiple wagering game players. For this example, the sensory area 112 and the wagering game player 120 are used. Stages A-E describe operations in response to a wagering game player performing player authentication. Stages F-J describe operations in response to a wagering game player performing a wagering game play after the player authentication.

Figure 2:
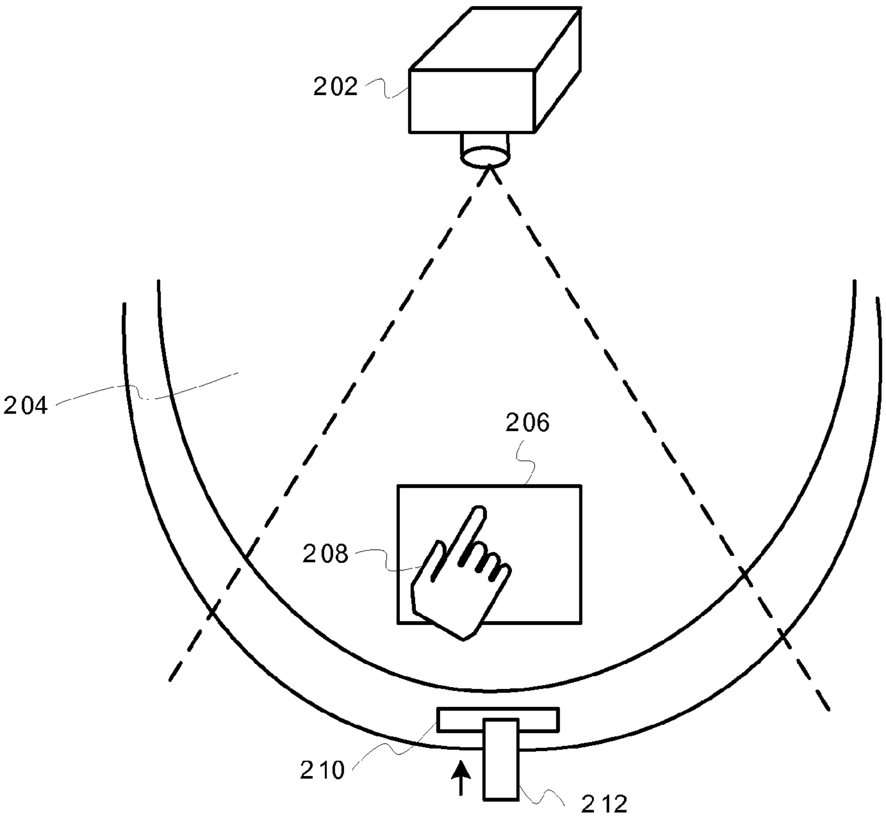
FIG. 2 depicts a camera and a part of wagering game table having a sensory area and an input device for player authentication, according to some example embodiments.

At stage A, an input device of the wagering game table 104 detects receipt of player identification for player authentication from the wagering game player 120. An example of an input device can include a card reader device that is configured to receive a player card having a magnetic strip. The card reader device configured to provide the identification of the wagering game player based on a scan of the magnetic strip from the player card. Therefore, in this example, the detection occurs in response to the wagering game player 120 inserting their player card into the card reader device. Other examples of input devices can include a type of dongle reader device that can receive player identification (wired or wireless) from a machine-readable storage medium in the dongle, retinal or fingerprint scanning device that provide an identification of a player, keyboard for inputs of player name and password, etc. The input devices are not shown in FIG. 1. However, an example of such input devices is shown in FIG. 2, which is described in more detail below. The input device transmits the player identification data over the communications network 150 to the wagering game controller 154.

At stage B, the sensory area 112 of the wagering game table 104 detects the touch of the wagering game player. The operations at stages A and B can be performed at the same time or opposite as described. In some example embodiments, the sensory area 112 can surround the entry of the input device 210. In such embodiments, the inputting of the player identification data can occur simultaneously with the touch sensing. In some example embodiments, once both operations have occurred a control signal can be transmitted to a controller of the camera 102. The control signal can instruct the camera 102 to capture an image or images around the sensory area 112 that includes at least part of the wagering game player and the sensory area 112. For example, the image can comprise the face, head, arms, upper body, etc. of the wagering game player. As further described below, some other example embodiments position a number of different cameras at different locations, different heights, etc. Accordingly, a number of cameras can capture images of the wagering game player.

In some example embodiments, the camera 102 is recording video generally (not tied to a specified player movement). For example, the camera 102 can be recording video any time there are wagering game players attempting to be authenticated, performing wagering game plays, etc. The camera 102 can be recording time stamps to be associated with images within the video. Accordingly, instead of a control signal being transmitted to the camera 102, the sensory area 112 can denote starting and stopping timestamps for recording the player during the player authentication. The camera 102 can transmit these associated images having timestamps within the range of the starting and stopping timestamps to the wagering game controller 154 (see stage C below).

Therefore, at stage C, the camera 102 captures the player image(s) for player authentication. Also in response to the control signal, the camera transmits the image(s) to the wagering game controller 154 over the communications network 150. In some example embodiments, the cameras would be continuously capturing images to enable tracking and modeling of the players' general body shape (e.g., torso, arms, hands, etc.) in real time. In some example embodiments, the wagering game controller 154 can receive these images of the different parts of a player's body and can track and model the player's general body shape (e.g., torso, arms, hands, etc.).

At stage D, the wagering game controller 154 receives the player identification data from the input device and the player image(s) from the camera 102.

At stage E, the wagering game controller 154 associates the player identification data with the player image(s). For example, the wagering game controller 154 can store the player identification data and the player image(s) in some type of data structure(s) in machine-readable media. In some example embodiments, the wagering game controller 154 can derive some type of signature that uniquely represents the player image(s). This signature can be stored in place of the player image or can be stored in addition along with the player image(s). As further described below, the wagering game controller 154 can use the player image(s) and/or signature for subsequent comparisons to determine which player is performing a wagering game play. In some example embodiments, an escrow account to hold funds can be created for those players that wish to remain unidentified or are without a player's account. The players can still be tracked and have their positions and wagers tied to the escrow account. An access code and password would allow the players to regain access to their escrow account in the event they moved outside the system's viewable area. A time limit can be established under which the players are required to reenter the code and password (otherwise the players would forfeit their escrow account holdings).

Stages F-J describe operations in response to a wagering game player performing a wagering game play after the player authentication. At stage F, the sensory area 106 of the wagering game table 104 detects the touch of the wagering game player 120 as part of a wagering game play. For example, the wagering game player 120 can place or move chips (virtual or real) in a certain location on the sensory area 106. To illustrate, for roulette, the wagering game player 120 can place one or more virtual chips on a number, color, odd/even, etc. by moving the virtual chips from the player's stack of chips to a location on the roulette board. In response, the sensory area 106 transmits the wagering game play indication to the wagering game controller 154 through the communications network 150. The sensory area 106 can also detect where the movement originated. For example, the sensory area 106 can detect that the chips were moved from one location around the outer edge of the wagering game table 104 to a defined location on the roulette board.

Also in response to detecting the touch for wagering game play, the sensory area 106 can determine the amount of the wagering game play, the type of wagering game play, etc. For example, the sensory area 106 can determine based on the touch that the player wagered two fifty dollar chips on red for a roulette board. In particular, as described above, the sensory area 106 can make this determination based on the player dragging their virtual chips along the sensory area 106 from their stack to the red square on the roulette board. Alternative, the sensory area 106 can make this determination based on real chips based on some type of communication signal (e.g., RFID) on the chips.

The sensory area 106 transmits the attributes (e.g., type, amount, etc.) of the wagering game play to the wagering game controller 154 over the communications network 150. At stage G, the wagering game controller 154 receives the attributes of the wagering game play from the sensory area 106.

Also in response to detecting the touch for wagering game play, the sensory area 106 can transmit a control signal to the camera 102. The control signal can define the area where the wagering game play occurred and where the movement originated.

The control signal can instruct the camera 102 to capture an image around the defined area where the wagering game play occurred and/or the location where the wagering game player is positioned that performed the wagering game play. The control signal can also instruct the camera 102 to capture the image around the defined area around and just beyond the wagering game table 104 where the movement originated. This image of where the movement originated can capture the image of the player.

If there are a number of cameras (as further described below), the control signal can be transmitted to the one or more cameras that have the best viewing angle to capture this defined area. Therefore in this example, less than all of the cameras receive the control signal. For example, a first camera at some location located overhead of the wagering game table 104 can capture an image around the defined area where the wagering game play occurred, and a second camera located at or around the level of the wagering game table 104 can capture the image around the defined area around and just beyond the wagering game table 104 where the movement originated. The image captured by the second camera can provide an image of the player's face, body, etc.

As described above, in some example embodiments, the camera 102 is recording video generally (not tied to a specified player movement). For example, the camera 102 can be recording video any time there are wagering game players attempting to be authenticated, performing wagering game plays, etc. The camera 102 can be recording time stamps to be associated with images within the video. Accordingly, instead of a control signal being transmitted to the camera 102, the sensory area 112 can denote starting and stopping timestamps for recording the wagering game play. The camera 102 can transmit these associated images having timestamps within the range of the starting and stopping timestamps to the wagering game controller 154 (see stage H below).

At stage H, the camera 102 captures the player image(s) for the wagering game play. These image(s) capture at least a part of the wagering game player that performed the wagering game play. As described above, there can be multiple images captured by different cameras. Also in response to the control signal, the camera 102 transmits the image to the wagering game controller 154 over the communications network 150. In some example embodiments, the cameras would be continuously capturing images to enable tracking and modeling of the players' general body shape (e.g., torso, arms, hands, etc.) in real time.

At stage I, the wagering game controller 154 receives the image(s) of the wagering game play and player from the camera 102. The wagering game controller 154 then determines the identification of the wagering game player. In some example embodiments, the wagering game controller 154 can receive these images of the different parts of a player's body and can track and model the player's general body shape (e.g., torso, arms, hands, etc.). This model created based on the images captured during the wagering game play. For example, the wagering game controller 154 can create a signature of the portion of the image(s) that represent the player identification. To illustrate, the wagering game controller 154 can isolate a face, bone structure of the face, arms, etc. in the image(s). The wagering game controller 154 can then create a signature of these isolated portions of the image(s). Alternatively, the wagering game controller 154 does not create a signature, but isolates the portion of image(s) that represent the player (a face, bone structure of the face, arms, etc.). The wagering game controller 154 then compares the image(s) and/or the signature(s) to those images and/or the signatures that were stored as part of the player authentication of the wagering game players (see discussion of stages D and E above). In response to finding a match between the image(s) and/or the signature(s), the wagering game controller 154 determines the player identification that is associated with the stored image and/or signature that was a match (see discussion of the association of the player identification and the image at stage E above).

At stage J (in response to locating the player identification for the wagering game play), the wagering game controller 154 assigns the wagering game play to the player identified by the player identification. For example, the wagering game controller 154 can deduct an amount of the wagering game play from a player account that was identified during the player authentication.

FIG. 2 depicts a camera and a part of wagering game table having a sensory area and an input device for player authentication, according to some example embodiments. In particular, FIG. 2 depicts a camera 202 and a wagering game table 204. The section of the wagering game table 204 that is depicted in FIG. 2 includes that area that is used during player authentication. The wagering game table 204 includes a sensory area 206 and an input device 210. In this example, the input device 210 is a card reader that is configured to receive a player card 212 that provides player identification of wagering game player. For example, the player card 212 can include a magnetic strip that provides player identification encoded therein. The input device 210 can then determine the player identification by scanning this magnetic strip of the player card 212.

The sensory area 206 can be a part of the sensory area of the wagering game table 204 that is used to detect player touches for player authentication. Also shown in FIG. 2, a hand 208 of a wagering game player is touching the sensory area 206. Accordingly, as described above, the wagering game player can insert the player card 212 into the input device 210. The wagering game player can also touch the sensory area 206 with their hand 208. In response, a control signal is transmitted to the camera 202 to capture an image around the sensory area 206. A number of cameras can capture different images at different angles. For example, a different camera at around eye level of the wagering game player embedded in the wagering game table 204 can capture an image of the face of the wagering game player, bone structure of the face, etc. As described above, the player identification and the image(s) are then associated with each other and are used for assigning a wagering game play to a player. In some example embodiments, the cameras would be continuously capturing images to enable tracking and modeling of the players' general body shape (e.g., torso, arms, hands, etc.) in real time. When the authentication occurs, the appropriate tracked model is associated with the player's account. When a touch occurs, the particular player's account has a wagering entered therein.

Figure 3:
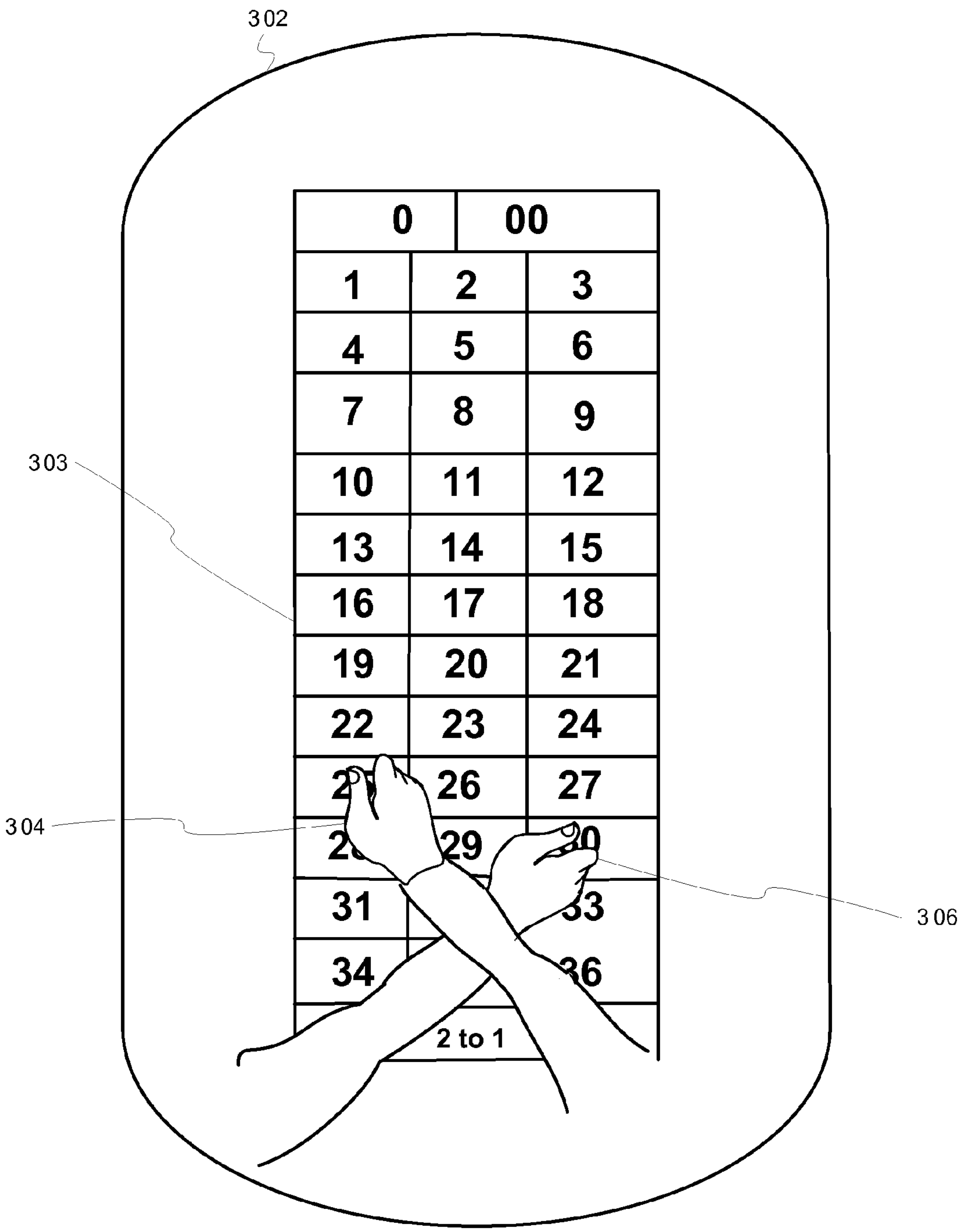
FIG. 3 depicts a wagering game table having a sensory area and arms of two different wagering game players, according to some example embodiments.

FIG. 3 depicts a wagering game table having a sensory area and arms of two different wagering game players, according to some example embodiments. In particular, FIG. 3 helps illustrate the usefulness of a camera (e.g., a three-dimensional camera) for properly identifying a player that made a wagering game play on a communal area on a wagering game table. In this example, a wagering game table 302 includes a communal area 303 for roulette. Multiple players can make wagering game plays in the same communal area (the communal area 303). FIG. 3 depicts an arm 304 of a first wagering game player and an arm 306 of a second wagering game player. As shown, the arm 304 and the arm 306 criss-cross each other. A camera that can capture a depth can determine that the two arms are from two different players and correctly associate the modeled images of each player with their hand and finger locations to facilitate correctly associating touch sensing to players' accounts.

Figure 4:
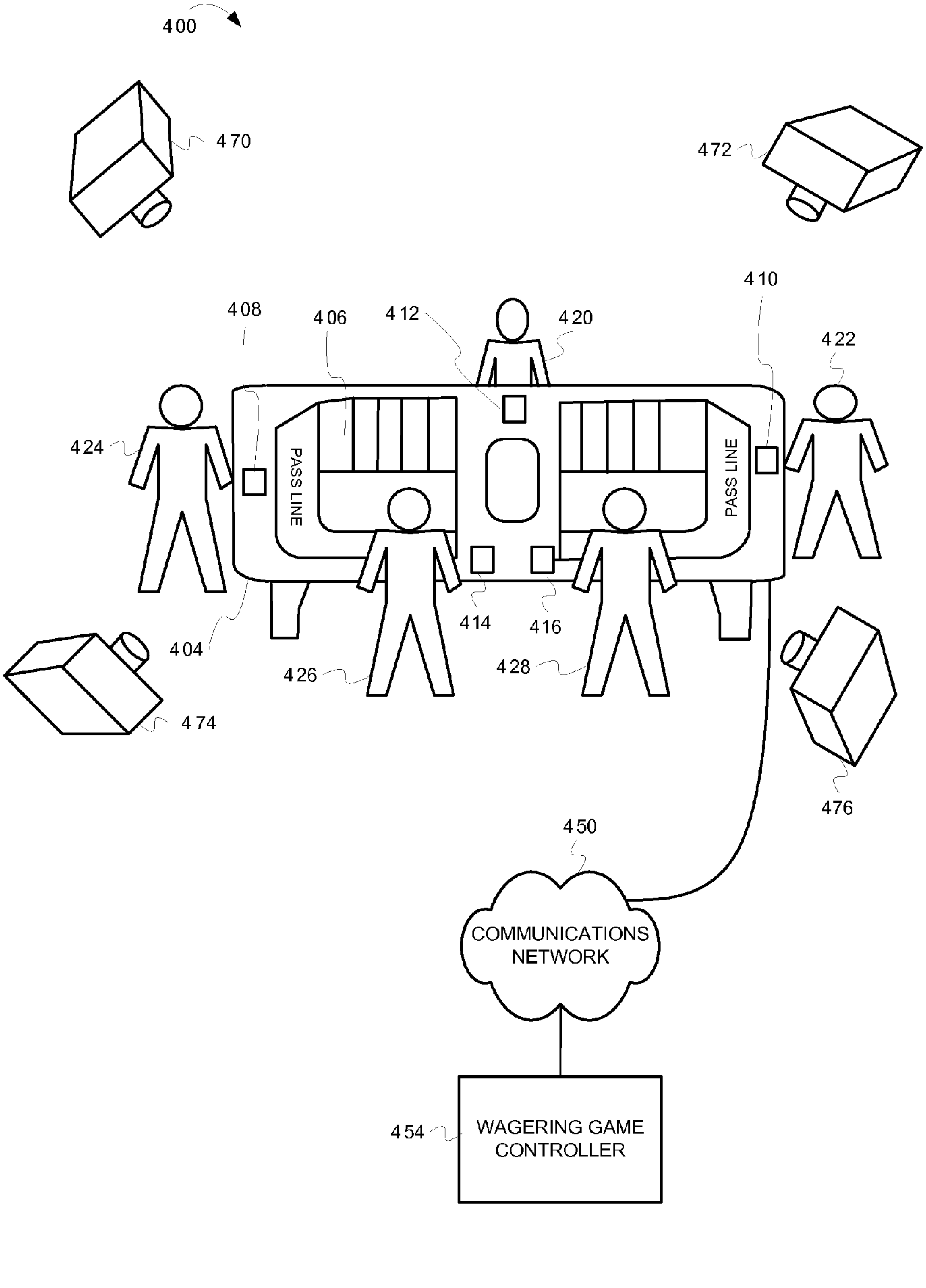
FIG. 4 depicts a system that includes a number of cameras that are positioned above a wagering game table for tracking player movement for both player authentication and player identification during wagering game play, according to some example embodiments.

FIG. 4 depicts a system that includes a number of cameras that is positioned above a wagering game table for tracking player movement for both player authentication and player identification during wagering game play, according to some example embodiments. In particular, FIG. 4 depicts a system 400 that includes a wagering game table 404, a camera 470, a camera 472, a camera 474, a camera 476, a wagering game controller 454, and a communications network 450. The wagering game table 404, the camera 470, the camera 472, the camera 474, the camera 476, and the wagering game controller 454 are communicatively coupled together through the communications network 450. In contrast to the system 100 of FIG. 1, the system 400 of FIG. 4 includes multiple of the cameras positioned above the wagering game table 404. In this example, the four different cameras are positioned just beyond the corners of the wagering game table 404. In such a configuration, images from more than one of the four different cameras can capture a player authentication or a wagering game play. Also, the captured images can be electronically stitched together to create an overall image for player authentication or tracking player movement. Also, the system 400 can include additional cameras positioned above the wagering game table 404 at different locations.

While described such that the wagering game controller 454 is communicatively coupled to the wagering game table 404 over the communications network 450. In some example embodiments, the wagering game controller 454 can be a part of the wagering game table 404. Also, in some example embodiments, the system 400 can include a number of wagering game tables that are communicatively coupled to the communications network 450, wherein the wagering game controller 454 can process player authentication and wagering game play from a number of players at each of the number of wagering game tables.

The wagering game table 404 includes a sensory area 406. The sensory area 406 can be across the entire top surface of the wagering game table 404. Alternatively, the sensory area 406 can be in those areas wherein player authentication and wagering game play occur. In some example embodiments, the sensory area 406 can spread to non-table surfaces (such as chair arms, fold-out chair tables, a tablet computer type gaming device, etc. that are linked to the system. The sensory area 406 can be one or more scanners (e.g., infrared laser scanners), one or more cameras (e.g., infrared cameras), and/or other devices used for detecting player touches on the wagering game table 404. The wagering game table 404 may also include processing hardware/software to process game event data and other information associated with the wagering table games and communicate with the wagering game controller 454.

In this example, the sensory area 406 includes a sensory area 408, a sensory area 410, a sensory area 412, a sensory area 414, and a sensory area 416. Each of the sensory area 408, the sensory area 410, the sensory area 412, the sensory area 414, and the sensory area 416 are at locations at the wagering game table 404 where a wagering game player can be authenticated for wagering game play. In some example embodiments, each of the sensory area 408, the sensory area 410, the sensory area 412, the sensory area 414, and the sensory area 416 are associated with an input device that is configured to receive player identification as part of a player authentication. An example of such a location is further described above in conjunction with FIG. 2.

Also shown in FIG. 4, there are a number of wagering game players—a wagering game player 420, a wagering game player 422, a wagering game player 424, a wagering game player 426, and a wagering game player 428. The wagering game player 420 is positioned in front of the sensory area 412. The wagering game player 422 is positioned in front of the sensory area 410. The wagering game player 424 is positioned in front of the sensory area 408. The wagering game player 426 is positioned in front of the sensory area 414. The wagering game player 428 is positioned in front of the sensory area 416. After player authentication, the wagering game players are allowed the freedom to move around the wagering game table 404. In other words, the player is not limited to a specific location during wagering game play. Accordingly, multiple wagering game players can be authenticated at a same location (e.g., the sensory area 412) at different times.

Various stages of example operations for a wagering game player can be performed similar to the stages shown in FIG. 1. Such operations are applicable for multiple wagering game players.

Figure 5:
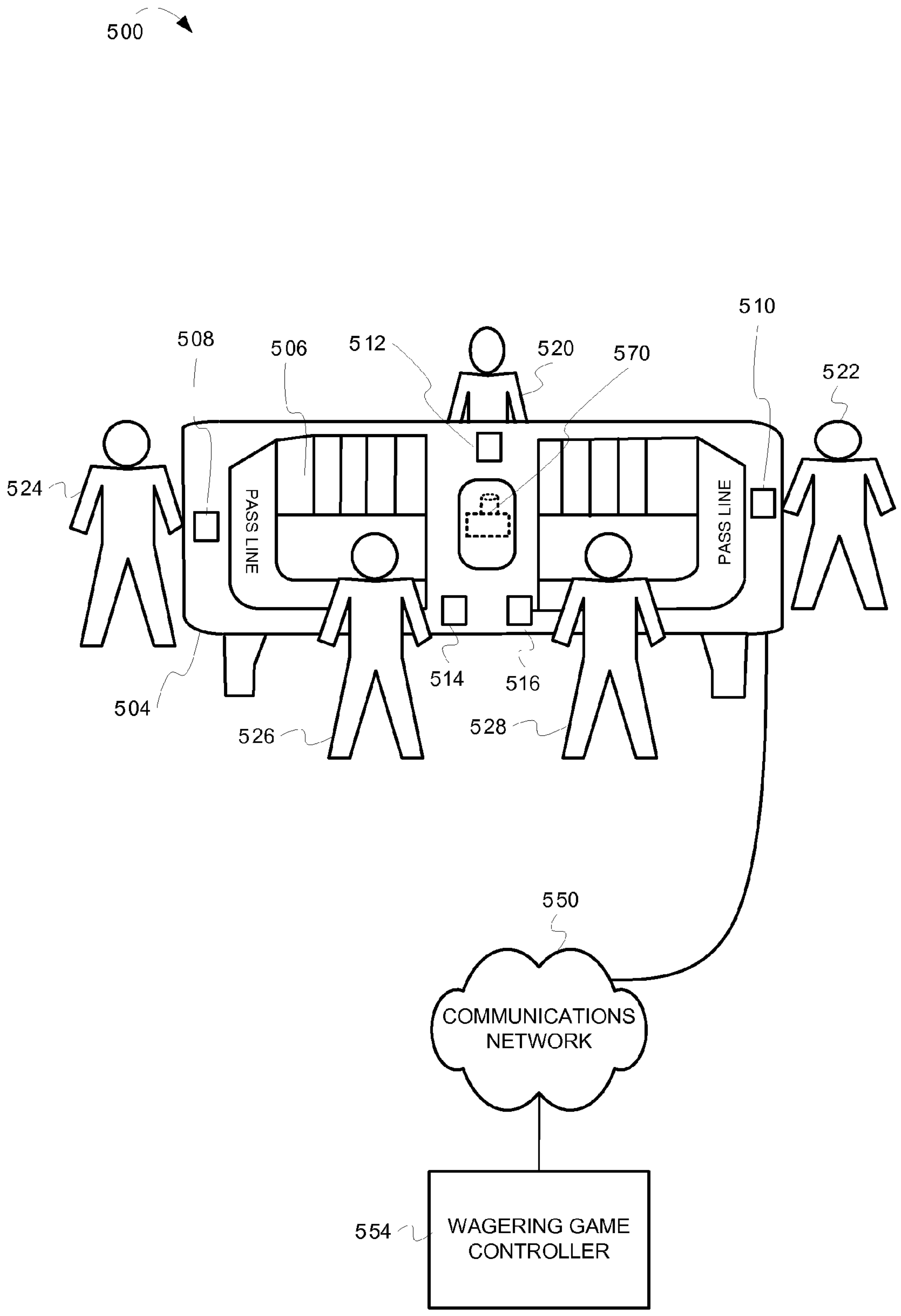
FIG. 5 depicts a system that includes a single camera that is positioned within or on a wagering game table for tracking player movement for both player authentication and player identification during wagering game play, according to some example embodiments.

FIG. 5 depicts a system that includes a camera that is positioned within or on a wagering game table for tracking player movement for both player authentication and player identification during wagering game play, according to some example embodiments. In particular, FIG. 5 depicts a system 500 that includes a wagering game table 504, a camera 570, a wagering game controller 554, and a communications network 550. The wagering game table 504, the camera 570, and the wagering game controller 554 are communicatively coupled together through the communications network 550. In contrast to the system 100 of FIG. 1 and the system 400 of FIG. 4, the system 500 of FIG. 5 includes one camera positioned in the wagering game table 504. In this example, the camera 570 can be below or along the surface of the wagering game table 504 and below eye level of the wagering game players. Such a configuration enables the camera to capture potentially better images of the faces of the wagering game players in comparison to cameras positioned above the wagering game table 504. While shown as positioned in the middle of the wagering game table 504, in some other example embodiments, the camera 570 can be positioned in other locations in the wagering game table 504.

While described such that the wagering game controller 554 is communicatively coupled to the wagering game table 504 over the communications network 550. In some example embodiments, the wagering game controller 554 can be a part of the wagering game table 504. Also, in some example embodiments, the system 500 can include a number of wagering game tables that are communicatively coupled to the communications network 550, wherein the wagering game controller 554 can process player authentication and wagering game play from a number of players at each of the number of wagering game tables.

The wagering game table 504 includes a sensory area 506. The sensory area 506 can be across the entire top surface of the wagering game table 504. Alternatively, the sensory area 506 can be in those areas wherein player authentication and wagering game play occur. The sensory area 506 can be one or more scanners (e.g., infrared laser scanners), one or more cameras (e.g., infrared cameras), and/or other devices used for detecting player touches on the wagering game table 504. The wagering game table 504 may also include processing hardware/software to process game event data and other information associated with the wagering table games and communicate with the wagering game controller 554.

In this example, the sensory area 506 includes a sensory area 508, a sensory area 510, a sensory area 512, a sensory area 514, and a sensory area 516. Each of the sensory area 508, the sensory area 510, the sensory area 512, the sensory area 514, and the sensory area 516 are at locations at the wagering game table 504 where a wagering game player can be authenticated for wagering game play. In some example embodiments, each of the sensory area 508, the sensory area 510, the sensory area 512, the sensory area 514, and the sensory area 516 are associated with an input device that is configured to receive player identification as part of a player authentication. An example of such a location is further described above in conjunction with FIG. 2.

Also shown in FIG. 5, there are a number of wagering game players—a wagering game player 520, a wagering game player 522, a wagering game player 524, a wagering game player 526, and a wagering game player 528. The wagering game player 520 is positioned in front of the sensory area 512. The wagering game player 522 is positioned in front of the sensory area 510. The wagering game player 524 is positioned in front of the sensory area 508. The wagering game player 526 is positioned in front of the sensory area 514. The wagering game player 528 is positioned in front of the sensory area 516. After player authentication, the wagering game players are allowed the freedom to move around the wagering game table 504. In other words, the player is not limited to a specific location during wagering game play. Accordingly, multiple wagering game players can be authenticated at a same location (e.g., the sensory area 512) at different times. Additionally, touch-based devices can optically scan objects that come in contact with the devices (e.g., In-Cell optical scanning). Such devices can be used to authenticate players anywhere on their surfaces.

Various stages of example operations for a wagering game player can be performed similar to the stages shown in FIG. 1. Such operations are applicable for multiple wagering game players.

Figure 6:
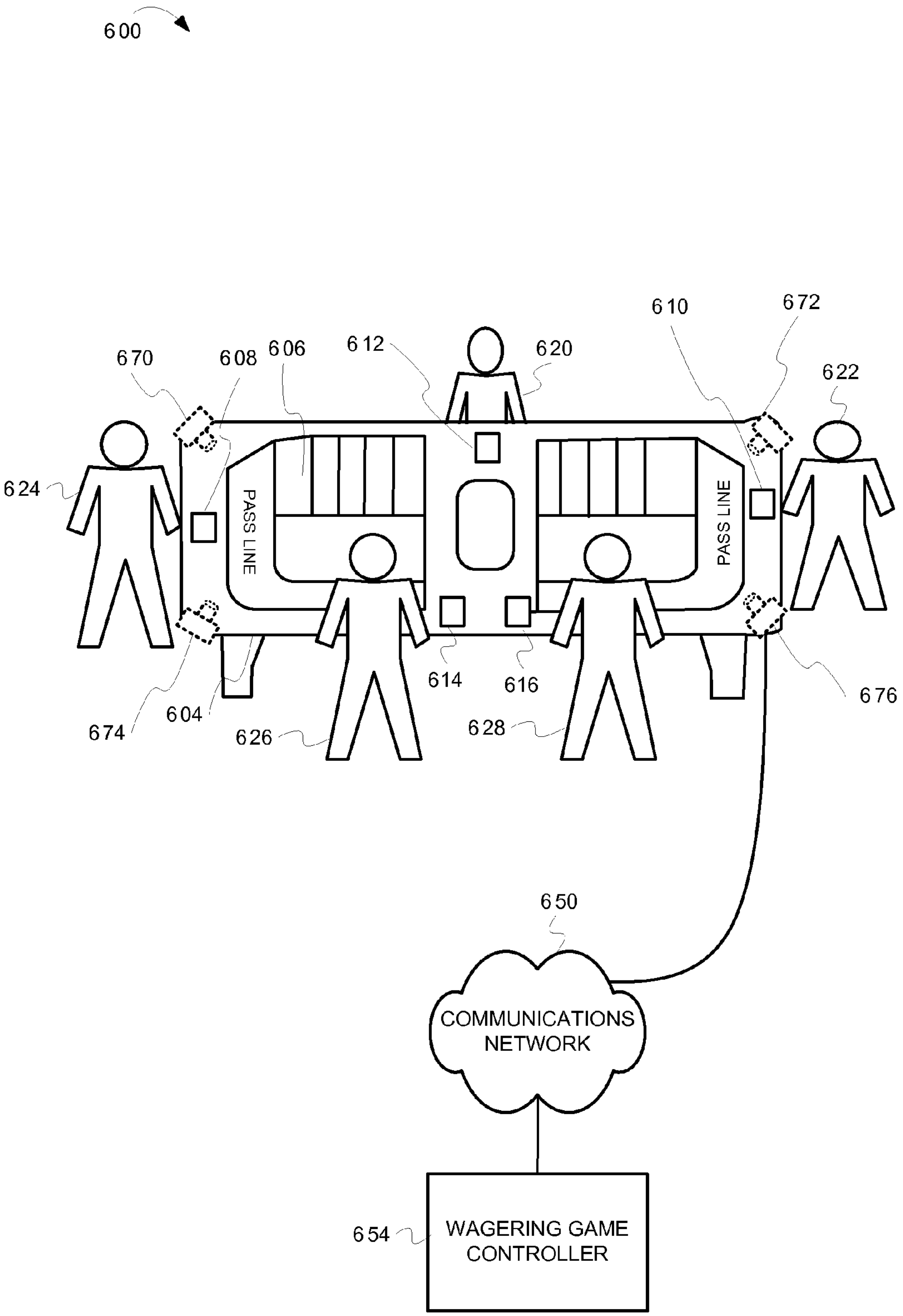
FIG. 6 depicts a system that includes a number of cameras that are positioned within or on a wagering game table for tracking player movement for both player authentication and player identification during wagering game play, according to some example embodiments.

FIG. 6 depicts a system that includes a number of cameras that is positioned within or on a wagering game table for tracking player movement for both player authentication and player identification during wagering game play, according to some example embodiments. In particular, FIG. 6 depicts a system 600 that includes a wagering game table 604, a camera 670, a camera 672, a camera 674, a camera 676, a wagering game controller 654, and a communications network 650. The wagering game table 604, the camera 670, the camera 672, the camera 674, the camera 676, and the wagering game controller 654 are communicatively coupled together through the communications network 650. In contrast to the system 100 of FIG. 1, the system 400 of FIG. 4, and the system 500 of FIG. 5, the system 600 of FIG. 6 includes multiple cameras positioned in or on the wagering game table 604. In this example, the camera 670, the camera 672, the camera 674, and the camera 676 can be below along the surface of the wagering game table 604 and below eye level of the wagering game players. Such a configuration enables the camera to capture potentially better images of the faces of the wagering game players in comparison to cameras positioned above the wagering game table 604. In such a configuration, images from more than one of the four different cameras can capture a player authentication or a wagering game play. Also, the captured images can be electronically stitched together to create an overall image for player authentication or tracking player movement. While shown as positioned in the corners of the wagering game table 604, in some other example embodiments, the camera 670, the camera 672, the camera 674, and the camera 676 can be positioned in other locations in the wagering game table 604. Also, the system 600 can include additional cameras in or on the wagering game table 604 at different locations.

While described such that the wagering game controller 654 is communicatively coupled to the wagering game table 604 over the communications network 650. In some example embodiments, the wagering game controller 654 can be a part of the wagering game table 604. Also, in some example embodiments, the system 600 can include a number of wagering game tables that are communicatively coupled to the communications network 650, wherein the wagering game controller 654 can process player authentication and wagering game play from a number of players at each of the number of wagering game tables.

The wagering game table 604 includes a sensory area 606. The sensory area 606 can be across the entire top surface of the wagering game table 604. Alternatively, the sensory area 606 can be in those areas wherein player authentication and wagering game play occur. The sensory area 606 can be one or more scanners (e.g., infrared laser scanners), one or more cameras (e.g., infrared cameras), and/or other devices used for detecting player touches on the wagering game table 604. The wagering game table 604 may also include processing hardware/software to process game event data and other information associated with the wagering table games and communicate with the wagering game controller 654.

In this example, the sensory area 606 includes a sensory area 608, a sensory area 610, a sensory area 612, a sensory area 614, and a sensory area 616. Each of the sensory area 608, the sensory area 610, the sensory area 612, the sensory area 614, and the sensory area 616 are at locations at the wagering game table 604 where a wagering game player can be authenticated for wagering game play. In some example embodiments, each of the sensory area 608, the sensory area 610, the sensory area 612, the sensory area 614, and the sensory area 616 are associated with an input device that is configured to receive player identification as part of a player authentication. An example of such a location is further described above in conjunction with FIG. 2.

Also shown in FIG. 6, there are a number of wagering game players—a wagering game player 620, a wagering game player 622, a wagering game player 624, a wagering game player 626, and a wagering game player 628. The wagering game player 620 is positioned in front of the sensory area 612. The wagering game player 622 is positioned in front of the sensory area 610. The wagering game player 624 is positioned in front of the sensory area 608. The wagering game player 626 is positioned in front of the sensory area 614. The wagering game player 628 is positioned in front of the sensory area 616. After player authentication, the wagering game players are allowed the freedom to move around the wagering game table 604. In other words, the player is not limited to a specific location during wagering game play. Accordingly, multiple wagering game players can be authenticated at a same location (e.g., the sensory area 612) at different times.

Various stages of example operations for a wagering game player can be performed similar to the stages shown in FIG. 1. Such operations are applicable for multiple wagering game players.

Figure 7:
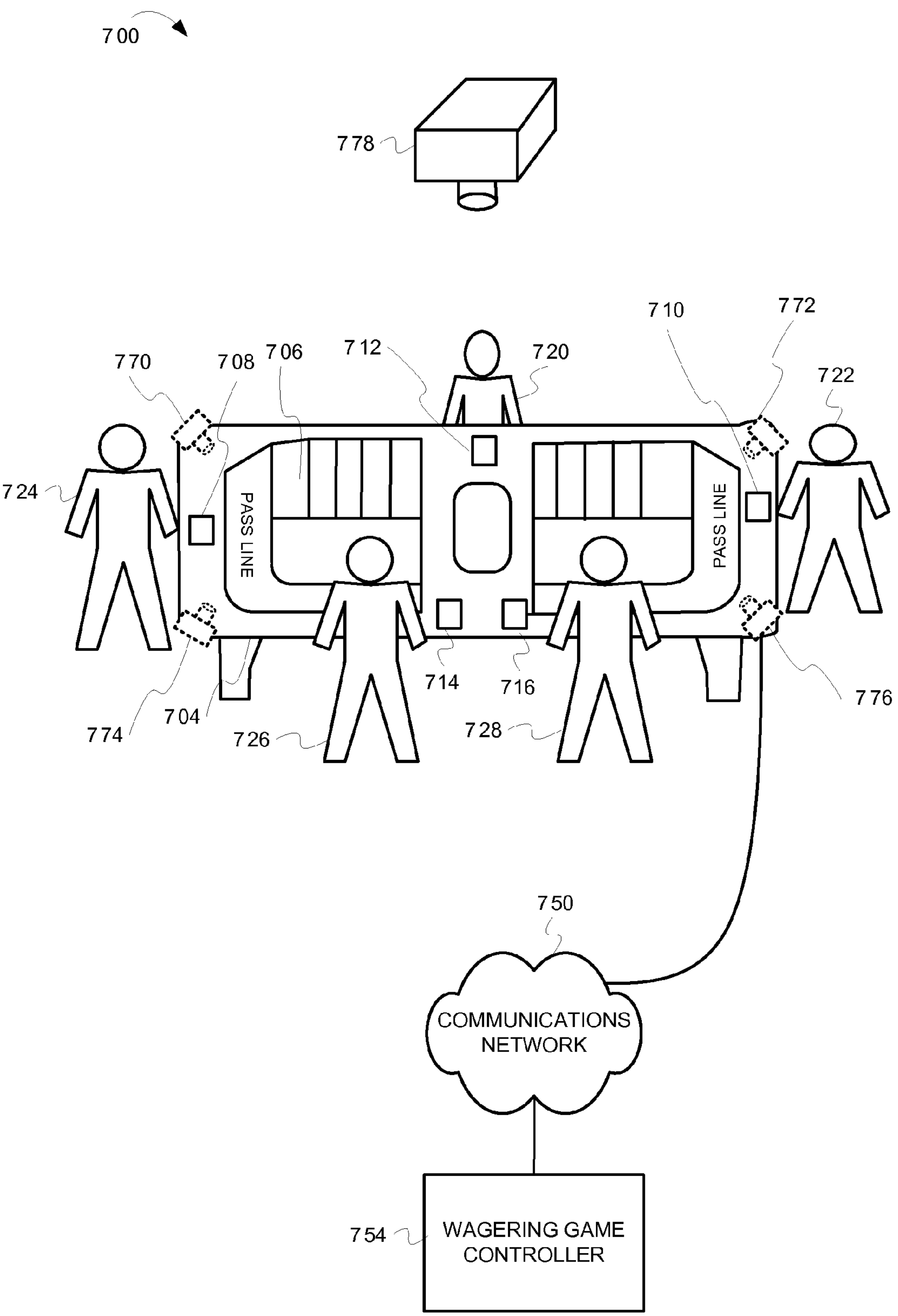
FIG. 7 depicts a system that includes a camera positioned above and a number of cameras that are positioned within or on a wagering game table for tracking player movement for both player authentication and player identification during wagering game play, according to some example embodiments.

FIG. 7 depicts a system that includes a camera positioned above and a number of cameras that are positioned within or on a wagering game table for tracking player movement for both player authentication and player identification during wagering game play, according to some example embodiments. In particular, FIG. 7 depicts a system 700 that includes a wagering game table 704, a camera 770, a camera 772, a camera 774, a camera 776, a camera 778, a wagering game controller 754, and a communications network 750. The wagering game table 704, the camera 770, the camera 772, the camera 774, the camera 776, the camera 778, and the wagering game controller 754 are communicatively coupled together through the communications network 750.

In contrast to the system 100 of FIG. 1, the system 400 of FIG. 4, the system 500 of FIG. 5, and the system 600 of FIG. 6, the system 700 of FIG. 7 includes cameras positioned above the wagering game table 704 and positioned in or on the wagering game table 704. In this example, the camera 770, the camera 772, the camera 774, and the camera 776 can be below along the surface of the wagering game table 704 and below eye level of the wagering game players. Such a configuration enables the camera to capture potentially better images of the faces of the wagering game players in comparison to cameras positioned above the wagering game table 704. In such a configuration, images from more than one of the four different cameras can capture a player authentication or a wagering game play. The system 700 also includes a camera 778 positioned above the wagering game table 704. While shown with one camera positioned above, in some example embodiments, multiple cameras can be positioned above the wagering game table 704 (see the system 400 of FIG. 4). Accordingly, images can be captured above the wagering game table 704 and at the surface of the wagering game table 704. Also, the captured images can be electronically stitched together to create an overall image for player authentication or tracking player movement. While shown as positioned in the corners of the wagering game table 704, in some other example embodiments, the camera 770, the camera 772, the camera 774, and the camera 776 can be positioned in other locations in the wagering game table 704. Also, the system 700 can include additional cameras in or on the wagering game table 704 at different locations.

While described such that the wagering game controller 754 is communicatively coupled to the wagering game table 704 over the communications network 750. In some example embodiments, the wagering game controller 754 can be a part of the wagering game table 704. Also, in some example embodiments, the system 700 can include a number of wagering game tables that are communicatively coupled to the communications network 750, wherein the wagering game controller 754 can process player authentication and wagering game play from a number of players at each of the number of wagering game tables.

The wagering game table 704 includes a sensory area 706. The sensory area 706 can be across the entire top surface of the wagering game table 704. Alternatively, the sensory area 706 can be in those areas wherein player authentication and wagering game play occur. The sensory area 706 can be one or more scanners (e.g., infrared laser scanners), one or more cameras (e.g., infrared cameras), and/or other devices used for detecting player touches on the wagering game table 704. The wagering game table 704 may also include processing hardware/software to process game event data and other information associated with the wagering table games and communicate with the wagering game controller 754.

In this example, the sensory area 706 includes a sensory area 708, a sensory area 710, a sensory area 712, a sensory area 714, and a sensory area 716. Each of the sensory area 708, the sensory area 710, the sensory area 712, the sensory area 714, and the sensory area 716 are at locations at the wagering game table 704 where a wagering game player can be authenticated for wagering game play. In some example embodiments, each of the sensory area 708, the sensory area 710, the sensory area 712, the sensory area 714, and the sensory area 716 are associated with an input device that is configured to receive player identification as part of a player authentication. An example of such a location is further described above in conjunction with FIG. 2.

Also shown in FIG. 7, there are a number of wagering game players—a wagering game player 720, a wagering game player 722, a wagering game player 724, a wagering game player 726, and a wagering game player 728. The wagering game player 720 is positioned in front of the sensory area 712. The wagering game player 722 is positioned in front of the sensory area 710. The wagering game player 724 is positioned in front of the sensory area 708. The wagering game player 726 is positioned in front of the sensory area 714. The wagering game player 728 is positioned in front of the sensory area 716. After player authentication, the wagering game players are allowed the freedom to move around the wagering game table 704. In other words, the player is not limited to a specific location during wagering game play. Accordingly, multiple wagering game players can be authenticated at a same location (e.g., the sensory area 712) at different times.

Various stages of example operations for a wagering game player can be performed similar to the stages shown in FIG. 1. Such operations are applicable for multiple wagering game players.

The systems in FIGS. 1 and 4-7 are different examples of number and location of cameras. Such examples can be combined. For example, the cameras shown in FIGS. 1 and 4 can be combined. In another example, the cameras shown in FIGS. 4 and 6 can be combined, etc. Also, some systems can include less or more cameras at different locations, different heights, etc. Some example embodiments can span multiple tables in a same or different wagering game establishment. For example, there may be a large poker tournament taking place using the tables described herein. In such a configuration, the players can authenticate and play remotely in a tournament that spans across multiple tables in a same or different wagering game establishment.

Example Operations

This section describes operations associated with some example embodiments. In the discussion below, the flowcharts will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flowchart.

Figure 8:
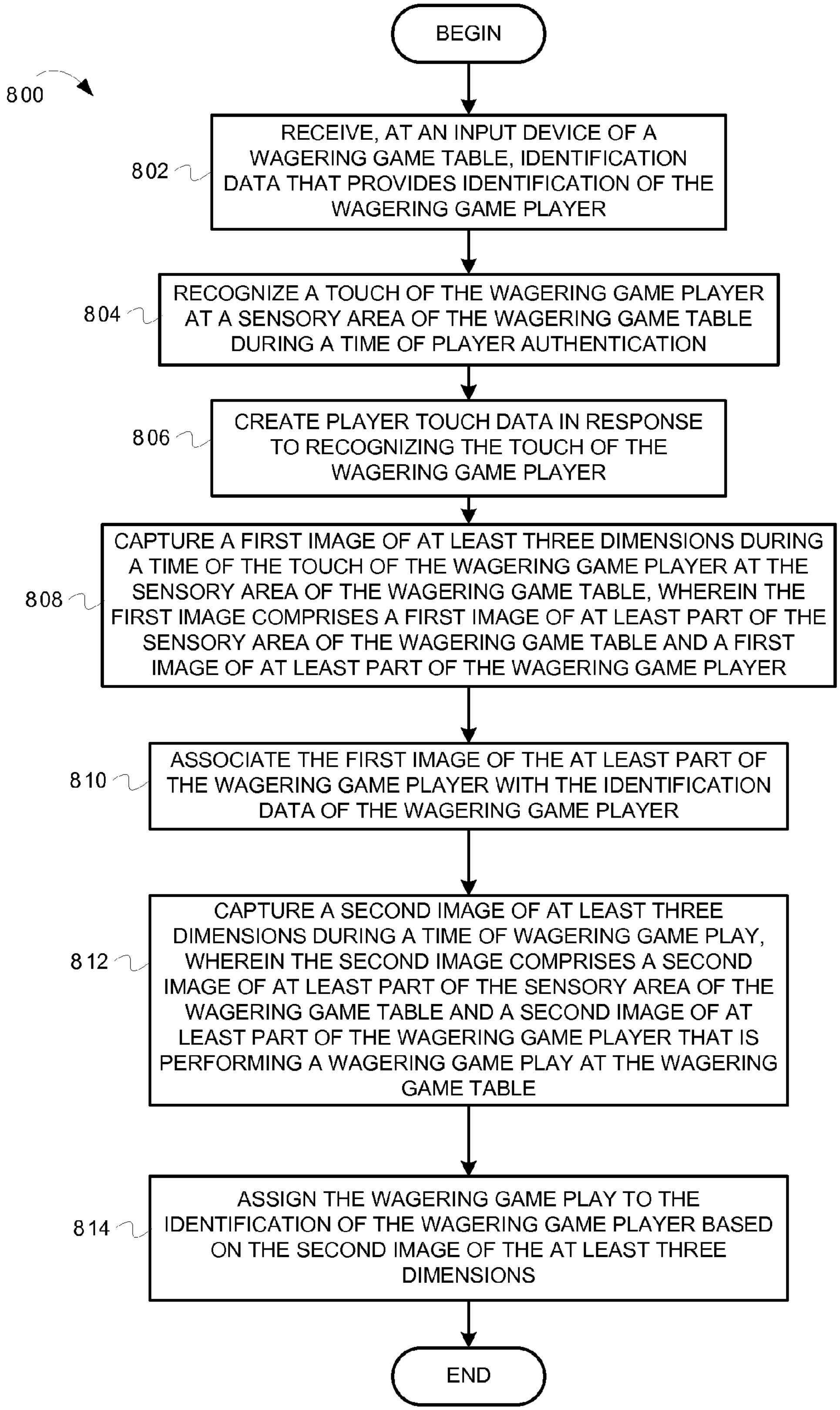
FIG. 8 depicts a flowchart of operations of components of a wagering game table and a controller for assigning a wagering game play at a wagering game table to a player, according to some example embodiments.
Figure 9:
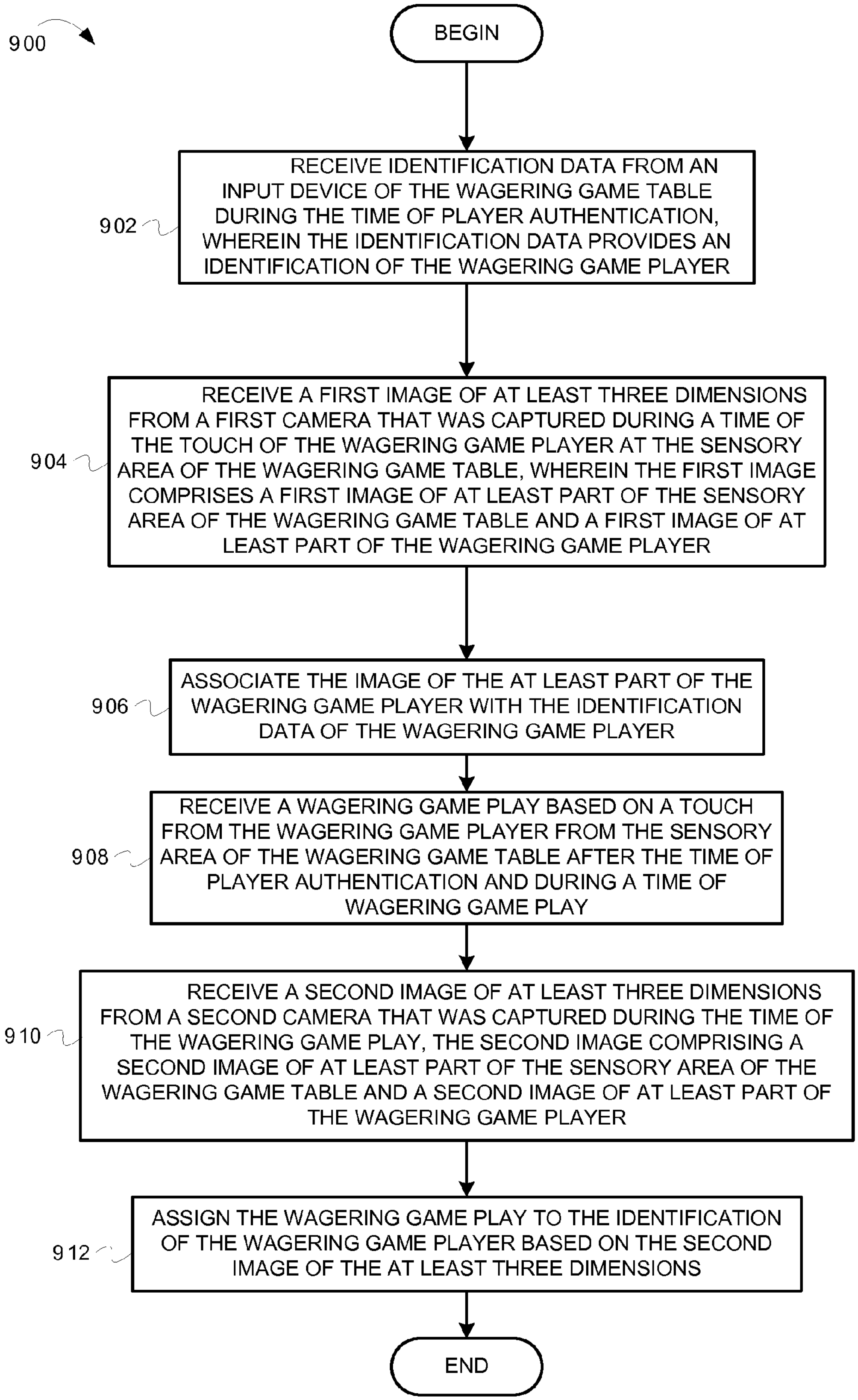
FIG. 9 depicts a flowchart of operations of a controller for assigning a wagering game play at a wagering game table to a player, according to some example embodiments.

The section will discuss FIGS. 8-9. Both FIGS. 8 and 9 describe operations for assigning a wagering game play at a wagering game table to a player. FIG. 8 describes such operations from the perspective of components of the wagering game table and the wagering game controller. FIG. 9 describes such operations from the perspective of the wagering game controller.

FIG. 8 depicts a flowchart of operations of components of a wagering game table and a controller for assigning a wagering game play at a wagering game table to a player, according to some example embodiments. In this example, operations of a flowchart 800 are described in reference to the components of the system 100 of FIG. 1. However, such operations can be performed by any of the previously described systems of FIGS. 1 and 4-7. The operations of the flowchart 800 begin at block 802.

At block 802, an input device of a wagering game table receives identification data that provides identification of the wagering game player. With reference to FIG. 2 as an example, the input device 210 of the wagering game table 204 is a card reader. Other embodiments of authentication devices can include RFID, NFC, In-Cell optical, glyph reading cameras, etc. In some example embodiments, the authentication can include a device such as an e-dauber that is used to place wagers, but also intermittently can scan the hand of the player holding the device for authentication. The card reader receives the identification of the wagering game player by a scan of the magnetic strip on a player card that is inputted therein. With reference to FIG. 1, the wagering game player 120 inputs their player identification into an input device. The operations of the flowchart 800 continue at block 804.

At block 804, a sensory area recognizes a touch of the wagering game player of the wagering game table during a time of player authentication. With reference to FIG. 1, the sensory area 112 detects the touch of the wagering game player 120. The operations of the flowchart 800 continue at block 806.

At block 806, the sensory area of the wagering game table creates player touch data in response to recognizing the touch of the wagering game player. With reference to FIG. 1, the sensory area 112 creates the player touch data in response to recognizing the touch of the wagering game player 120. The operations of the flowchart 800 continue at block 808.

At block 808, at least one camera captures first image(s) of multiple dimensions (e.g., two dimensions, three dimensions, etc.) during a time of the touch of the wagering game player at the sensory area of the wagering game table. The first image comprises a first image of at least part of the sensory area of the wagering game table and a first image of at least part of the wagering game player. This capturing of the first image(s) is in response to the input device receive the player identification and the sensory area detecting a touch of the player. With reference to FIG. 1, the camera 102 captures the player image for player authentication. As described above, one or more cameras can capture one or more images related to the player authentication. In some example embodiments, the cameras would be continuously capturing images to enable tracking and modeling of the players' general body shape (e.g., torso, arms, hands, etc.) in real time. In some example embodiments, the wagering game controller 154 can receive these images of the different parts of a player's body and can track and model the player's general body shape (e.g., torso, arms, hands, etc.). Also with reference to FIG. 1, the camera 102 transmits the image(s) to the wagering game controller 154 over the communications network 150. The operations of the flowchart 800 continue at block 810.

At block 810, a wagering game controller associates the first image(s) of at least part of the wagering game player with the identification data of the wagering game player. With reference to FIG. 1, the wagering game controller 154 associates the player identification data with the player image. For example, the wagering game controller 154 can store the player identification data and the player image in some type of data structure(s) in machine-readable media. In some example embodiments, the model derived from the player images can be associated with the identification data of the wagering game player. In some example embodiments, the wagering game controller 154 can derive some type of signature that uniquely represents the player image and/or the derived model. This signature can be stored in place of the player image and/or derived model or can be stored in addition along with the player image and/or derived model. As further described below, the wagering game controller 154 can use the player image and/or signature for subsequent comparisons to determine which player is performing a wagering game play. The operations of the flowchart 800 continue at block 812.

At block 812, at least one camera captures at least one second image(s) of at least three dimensions during a time of wagering game play. The second image(s) comprises a second image of at least part of the sensory area of the wagering game table and a second image of at least part of the wagering game player that is performing a wagering game play at the wagering game table. This capturing of the second image(s) is in response to the sensory area detecting a touch of the player for wagering game play. With reference to FIG. 1, the camera 102 captures the image(s) for wagering game play. As described above, there can be multiple images captured by different cameras. In some example embodiments, the cameras would be continuously capturing images to enable tracking and modeling of the players' general body shape (e.g., torso, arms, hands, etc.) in real time. Also, the camera 102 transmits the image to the wagering game controller 154 over the communications network 150. The operations of the flowchart 800 continue at block 814.

At block 814, the wagering game controller assigns the wagering game play to the identification of the wagering game player based on the second image of the at least three dimensions and/or derived model. With reference to FIG. 1, the wagering game controller 154 receives the image(s) of the wagering game play and player from the camera 102. The wagering game controller 154 then determines the identification of the wagering game player. For example, the wagering game controller 154 can create a signature and/or derived model of the portion of the image(s) that represent the player identification. To illustrate, the wagering game controller 154 can isolate a face, bone structure of the face, arms, etc. in the image(s). The wagering game controller 154 can then create a signature of these isolated portions of the image(s). In some example embodiments, the wagering game controller 154 can receive these images of the different parts of a player's body and can track and model the player's general body shape (e.g., torso, arms, hands, etc.). Alternatively, the wagering game controller 154 does not create a signature, but isolates the portion of image(s) that represent the player (a face, bone structure of the face, arms, etc.). The wagering game controller 154 then compares the image(s), the derived model(s) and/or the signature(s) to those images, derived model(s) and/or the signatures that were stored as part of the player authentication of the wagering game players (see discussion of stages D and E above). In response to finding a match between the image(s), derived model(s) and/or the signature (s), the wagering game controller 154 determines the player identification that is associated with the stored image, derived model(s) and/or signature that was a match. The wagering game controller 154 assigns the wagering game play to the player identified by the player identification. For example, the wagering game controller 154 can deduct an amount of the wagering game play from a player account that was identified during the player authentication. The operations of the flowchart 800 are complete.

FIG. 9 depicts a flowchart of operations of a controller for assigning a wagering game play at a wagering game table to a player, according to some example embodiments. In this example, operations of a flowchart 900 are described in reference to the components of the system 100 of FIG. 1. However, such operations can be performed by any of the previously described systems of FIGS. 1 and 4-7. The operations of the flowchart 900 begin at block 902.

At block 902, the wagering game controller receives identification data from an input device of the wagering game table during the time of player authentication, wherein the identification data provides an identification of the wagering game player. With reference to FIG. 1, the wagering game controller 154 receives the identification data from an input device of the wagering game table 104 over the communications network 150. The operations of the flowchart 900 continue at block 904.

At block 904, the wagering game controller receives first image(s) of at least three dimensions from a first camera that was captured during a time of the touch of the wagering game player at the sensory area of the wagering game table. The first image(s) can comprise a first image of at least part of the sensory area of the wagering game table and a first image of at least part of the wagering game player. In some example embodiments, the cameras would be continuously capturing images to enable tracking and modeling of the players' general body shape (e.g., torso, arms, hands, etc.) in real time. In some example embodiments, the wagering game controller 154 can receive these images of the different parts of a player's body and can track and model the player's general body shape (e.g., torso, arms, hands, etc.). With reference to FIG. 1, the wagering game controller 154 receives the first image(s) from the camera 102. The operations of the flowchart 900 continue at block 906.

At block 906, the wagering game controller associates the image and/or derived model of the at least part of the wagering game player with the identification data of the wagering game player. The operations of the flowchart 900 continue at block 908.

At block 908, the wagering game controller receives a wagering game play based on a touch from the wagering game player from the sensory area of the wagering game table after the time of player authentication and during a time of wagering game play. With reference to FIG. 1, the sensory area 106 of the wagering game table 104 detects the touch of the wagering game player 120 as part of a wagering game play. For example, the wagering game player 120 can place or move chips (virtual or real) in a certain location on the sensory area 106. To illustrate, for roulette, the wagering game player 120 can place one or more virtual chips on a number, color, odd/even, etc. by moving the virtual chips from the player's stack of chips to a location on the roulette board. In response, the sensory area 106 transmits the wagering game play indication to the wagering game controller 154 through the communications network 150. The sensory area 106 can also detect where the movement originated. For example, the sensory area 106 can detect that the chips were moved from one location around the outer edge of the wagering game table 104 to a defined location on the roulette board. Also in response to detecting the touch for wagering game play, the sensory area 106 can determine the amount of the wagering game play, the type of wagering game play, etc. For example, the sensory area 106 can determine based on the touch that the player wagered two fifty dollar chips on red for a roulette board. In particular, as described above, the sensory area 106 can make this determination based on the player dragging their virtual chips along the sensory area 106 from their stack to the red square on the roulette board. Alternative, the sensory area 106 can make this determination based on real chips based on some type of communication signal (e.g., RFID) on the chips; or through use of calibration glyphs shown on the display table corners that can be read by the cameras. The sensory area 106 transmits the attributes (e.g., type, amount, etc.) of the wagering game play to the wagering game controller 154 over the communications network 150. The wagering game controller 154 receives the attributes of the wagering game play from the sensory area 106. The operations of the flowchart 900 continue at block 910.

At block 910, the wagering game controller receives a second image of at least three dimensions from a second camera that was captured during the time of the wagering game play. The second image can comprises a second image of at least part of the sensory area of the wagering game table and a second image of at least part of the wagering game player. With reference to FIG. 1, the wagering game controller 154 receives the image(s) of the wagering game play and player from the camera 102. The wagering game controller 154 then determines the identification of the wagering game player. In some example embodiments, the cameras would be continuously capturing images to enable tracking and modeling of the players' general body shape (e.g., torso, arms, hands, etc.) in real time. In some example embodiments, the wagering game controller 154 can receive these images of the different parts of a player's body and can track and model the player's general body shape (e.g., torso, arms, hands, etc.). Also, the wagering game controller 154 can create a signature of the portion of the image(s) that represent the player identification. To illustrate, the wagering game controller 154 can isolate a face, bone structure of the face, arms, etc. in the image(s). The wagering game controller 154 can then create a signature of these isolated portions of the image(s). Alternatively, the wagering game controller 154 does not create a signature, but isolates the portion of image(s) that represent the player (a face, bone structure of the face, arms, etc.). The wagering game controller 154 then compares the image(s) and/or the signature(s) to those images and/or the signatures that were stored as part of the player authentication of the wagering game players (see discussion of stages D and E above). In response to finding a match between the image(s) and/or the signature(s), the wagering game controller 154 determines the player identification that is associated with the stored image and/or signature that was a match (see discussion of the association of the player identification and the image at stage E above). The operations of the flowchart 900 continue at block 912.

At block 912, the wagering game controller assigns the wagering game play to the identification of the wagering game player based on the second image of the at least three dimensions. With reference to FIG. 1 (in response to locating the player identification for the wagering game play), the wagering game controller 154 assigns the wagering game play to the player identified by the player identification. For example, the wagering game controller 154 can deduct an amount of the wagering game play from a player account that was identified during the player authentication. The operations of the flowchart 900 are complete.

Wagering Game System Architectures

Figure 10:
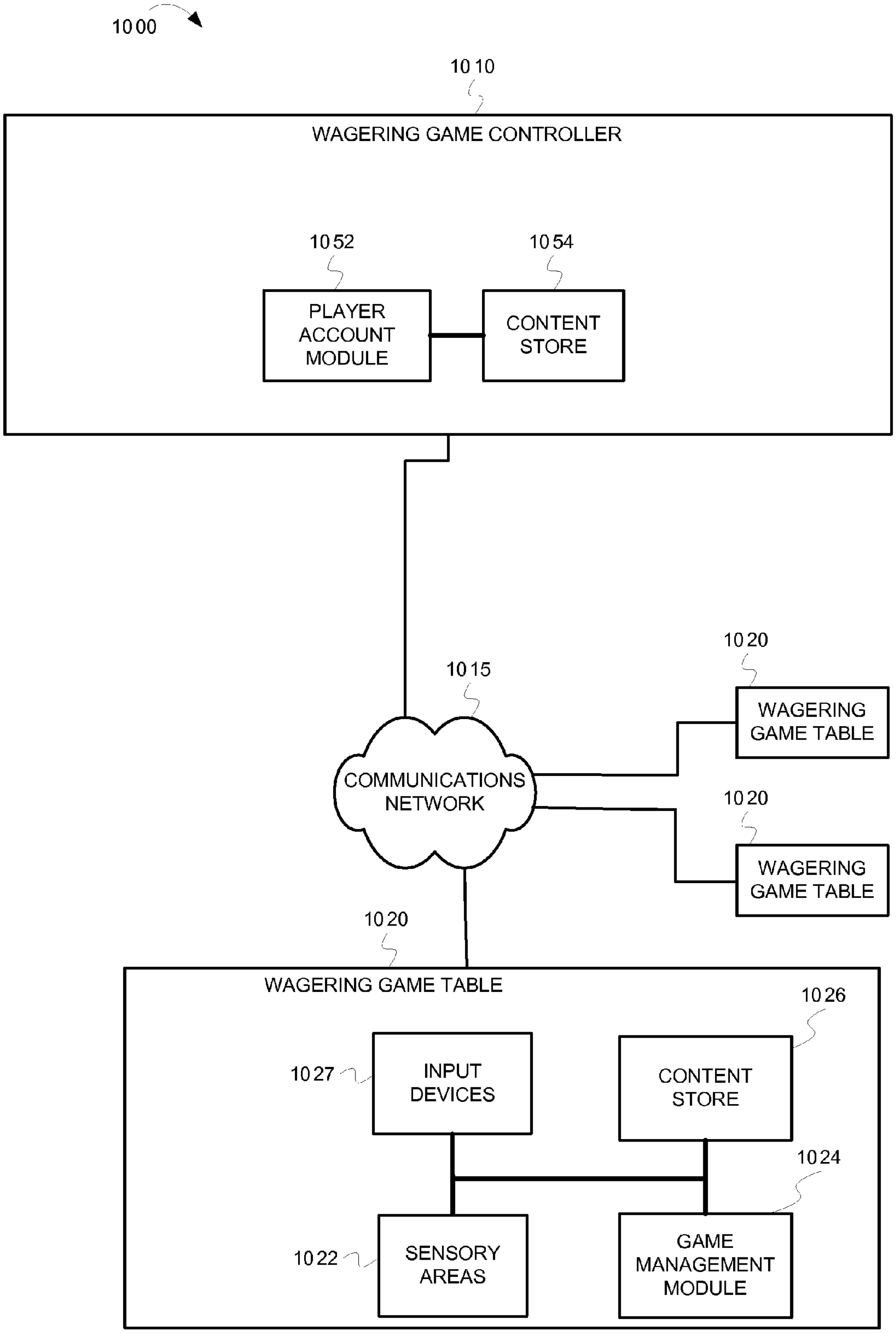
FIG. 10 is a conceptual diagram that illustrates an example of a wagering game system architecture, according to some example embodiments.

This section describes example wagering game machine architectures. FIG. 10 is a conceptual diagram that illustrates an example of a wagering game system architecture, according to some example embodiments. As illustrated, a wagering game system architecture 1000 includes a wagering game controller 1010, a plurality of wagering game tables 1020, and a plurality of wagering game machines 1060. The wagering game controller 1010 is configured to process game content (e.g., game results) from the wagering game tables 1020. The wagering game controller 1010 includes a player account module 1052 and a content store 1054.

The player account module 1052 can receive data from wagering game tables 1020 for player authentication and for wagering game play (as described above). The player account module 1052 can process such data. The player account module 1052 can also store data into the content store 1054. For example, the player account module 1052 can store images of a wagering game player with the associated player identification in the content store 1054. The player account module 1052 can also process images of a wagering game play to determine the wagering game player who made the play. The player account module 1052 can also update a player accounts based on the wagering game plays. The player accounts can be stored in the content store 1054 or some other machine-readable media local or remote to the wagering game controller 1010.

The wagering game tables 1020 are configured to detect player authentications and wagering game plays by wagering game players, and communicate data (e.g., images, player identification, attributes of wagering game plays, etc.) to the wagering game controller 1010. In some implementations, a wagering game table 1020 can include sensory areas 1022, a game management module 1024, a content store 1026, and input devices 1027. As described above, the sensory areas 1022 (e.g., laser scanners, cameras, etc.) are configured to detect game events (e.g., card combinations, roulette wheel results, etc.) associated with wagering table games being played by a plurality of players on the wagering game table 1020, and provide the game event data to the game management module 1024. The game management module 1024 is configured work in conjunction with the wagering game controller 1010 to process game events (e.g., wagering game plays, player authentication, etc.) detected at the wagering game table 1020. For the e-table implementation described above, the game management module 1024 can present a wagering table game on a main display area of the wagering game table 1020. The game management module 1024 can also generate game results based on random numbers received from the wagering game server 1050. The content store 1026 is configured to store content used related to player authentication, wagering game plays, player identifications, etc.

Each component shown in the wagering game system architecture 1000 is shown as a separate and distinct element connected via a communications network 1015. However, some functions performed by one component could be performed by other components. Furthermore, the components shown may all be contained in one device, but some, or all, may be included in, or performed by multiple devices, as in the configurations shown in FIG. 10 or other configurations not shown. Furthermore, the wagering game system architecture 1000 can be implemented as software, hardware, any combination thereof, or other forms of embodiments not listed. For example, any of the network components (e.g., the wagering game tables, controller, etc.) can include hardware and machine-readable media including instructions for performing the operations described herein. Machine-readable media includes any mechanism that provides (i.e., stores and/or transmits) information in a form readable by a machine (e.g., a wagering game table, machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. An apparatus comprising:

a wagering game table comprising, a sensory area configured to recognize a touch of a wagering game player and to create player touch data in response to the touch of the wagering game player; and an input device configured to receive identification data that provides identification of the wagering game player as part of player authentication;

a camera configured to capture at least one image during a time of the touch of the wagering game player at the sensory area of the wagering game table, the at least one image comprising an image of at least part of the sensory area of the wagering game table and an image of at least part of the wagering game player; and an authentication module communicatively coupled to the sensory area, the input device and the camera, wherein the authentication module is configured to receive the player touch data from the sensory area, the at least one image from the camera and the identification data from the input device, wherein the authentication module is configured to authenticate the identification of the wagering game player based, at least in part, on the identification data received from the input device as part of the player authentication, and the at least one image of the at least part of the wagering game player that is captured during the time of the touch of the wagering game player at the sensory area of the wagering game table.

2. The apparatus of claim 1, wherein the camera is configured to capture additional images, the additional images capturing movement of the wagering game player relative to the sensory area of the wagering game table.

3. The apparatus of claim 2, further comprising a wagering game module communicatively coupled to the sensory area of the wagering game table, the camera, and the authentication module, wherein the wagering game module is configured to associate a wagering game play with the wagering game player based on the identification data received from the input device as part of the player authentication and the additional images capturing movement of the wagering game player relative to the sensory area of the wagering game table.

4. The method of claim 3, further comprising:

determining a player account for the wagering game player that is derived from the authenticate of the identification of the wagering game player; and assigning the wagering game play to the player account based on the identification of the wagering game player that is based on the at least one image of the at least part of the wagering game player that is captured during the time of the touch of the wagering game player at the sensory area of the wagering game table and the additional images capturing movement of the wagering game player relative to the sensory area of the wagering game table.

5. The apparatus of claim 1, wherein the input device comprise a card reader device that is configured to receive a card having a magnetic strip, the card reader device configured to provide the identification of the wagering game player based on a scan of the magnetic strip.

6. The apparatus of claim 1, further comprising a different camera configured to capture at least one different image, the at least one different image comprising a different image of at least part of the sensory area of the wagering game table and a different image of at least part of the wagering game player, wherein the authentication module is communicatively coupled to the different camera and is configured to receive the at least one different image of the at least part of the wagering game player from the different camera, wherein the authentication module is configured to define an association of the identification of the wagering game player with the at least one different image of the at least part of the wagering game player.

7. An apparatus comprising:

a wagering game table comprising, a sensory area configured to recognize a first touch of a first wagering game player and to create first player touch data in response to the first touch of the first wagering game player during a time of authentication of the first wagering game player, wherein the sensory area is configured to receive a second touch of a second wagering game player and to create second player touch data in response to the second wagering game player during a time of authentication of the second wagering game player; and a first input device configured to receive first identification data that provides identification of the first wagering game player as part of player authentication;

a second input device configured to receive second identification data that provides identification of the second wagering game player as part of the player authentication;

at least one camera configured to capture a first image of at least three dimensions during a time of the touch of the first wagering game player at the sensory area of the wagering game table, the first image comprising an image of at least part of the sensory area of the wagering game table and an image of at least part of the first wagering game player, wherein the at least one camera is configured to capture a second image of at least three dimensions during a time of the touch of the second wagering game player at the sensory area of the wagering game table, the second image comprising an image of at least part of the sensory area of the wagering game table and an image of at least part of the second wagering game player; and an authentication module communicatively coupled to the sensory area, the first input device, the second input device and the at least one camera, wherein the authentication module is configured to receive the first player touch data from the sensory area, the first image from the at least one camera and the first identification data from the first input device, wherein the authentication module is configured to authenticate the identification of the first wagering game player with the image of the at least part of the first wagering game player based, at least in part, on, the first identification data from the first input device as part of the player authentication, and the first image of at least three dimensions during the time of the touch of the first wagering game player at the sensory area of the wagering game table, wherein the authentication module is configured to receive the second player touch data from the sensory area, the second image from the at least one camera and the second identification data from the second input device, wherein the authentication module is configured to authenticate the image of the at least part of the second wagering game player based, at least in part, on the second identification data from the second input device as part of the player authentication, and the second image of at least three dimensions during the time of the touch of the second wagering game player at the sensory area of the wagering game table.

8. The apparatus of claim 7, wherein the at least one camera is configured to capture additional images of at least three dimensions during wagering game play, the additional images capturing movement of the first wagering game player and the second wagering game player relative to the sensory area of the wagering game table.

9. The apparatus of claim 8, further comprising a wagering game module communicatively coupled to the sensory area of the wagering game table, the at least one camera, and the authentication module, wherein the wagering game module is configured to associate the wagering game play with the first wagering game player based on the first identification data received from the first input device as part of the player authentication and the additional images capturing movement of the first wagering game player relative to the sensory area of the wagering game table.

10. The apparatus of claim 9, further comprising:

a wagering game controller configured to, determine a player account for the first wagering game player that is derived from the authenticate of the identification of the first wagering game player; and assign the wagering game play to the player account based on the identification of the first wagering game player that is based on the image of the at least part of the first wagering game player that is captured during the time of the touch of the first wagering game player at the sensory area of the wagering game table and the additional images capturing movement of the first wagering game player relative to the sensory area of the wagering game table.

11. The apparatus of claim 7, wherein the first input device comprise a card reader device that is configured to receive a card having a magnetic strip, the card reader device configured to provide the identification of the first wagering game player based on a scan of the magnetic strip.

12. The apparatus of claim 7, wherein the at least one camera is configured to capture a third image of at least three dimensions, the third image comprising a different image of at least part of the sensory area of the wagering game table and a different image of at least part of the first wagering game player, wherein the authentication module is configured to receive the different image of the at least part of the first wagering game player and is configured to define an association of the identification of the first wagering game player with the different image of the at least part of the first wagering game player.

13. A method comprising:

receiving, at an input device of a wagering game table, identification data that provides identification of a wagering game player as part of player authentication;

recognizing a touch of the wagering game player at a sensory area of the wagering game table during a time of player authentication;

creating player touch data in response to recognizing the touch of the wagering game player;

capturing a first image of at least three dimensions during a time of the touch of the wagering game player at the sensory area of the wagering game table, the first image comprising a first image of at least part of the sensory area of the wagering game table and a first image of at least part of the wagering game player;

associating the first image of the at least part of the wagering game player with the identification data of the wagering game player;

capturing a second image of at least three dimensions during a time of wagering game play, the second image comprising a second image of at least part of the sensory area of the wagering game table and a second image of at least part of the wagering game player that is performing a wagering game play at the wagering game table; and assigning the wagering game play to the identification of the wagering game player based on the identification data that provides the identification of the wagering game player as part of the player authentication at the input device and the second image of the at least three dimensions that is captured during the time of the wagering game play.

14. The method of claim 13, wherein the input device comprise a card reader device that is configured to receive a card having a magnetic strip, the card reader device configured to provide the identification of the wagering game player based on a scan of the magnetic strip.

15. The method of claim 13, wherein capturing the second image comprises capturing the second image with a first camera, wherein the method comprises:

capturing a third image of at least three dimensions with a second camera during the time of wagering game play, the third image of the at least three dimensions comprising a third image of at least part of the sensory area of the wagering game table and a third image of at least part of the wagering game player.

16. The method of claim 15, wherein the assigning of the wagering game play to the identification of the wagering game player is based on the third image of the at least three dimensions.

17. The method of claim 13, wherein the wagering game player is positioned on a first side of the wagering game table during the capturing of the first image, and wherein the wagering game player is positioned on an opposite side relative to the first side of the wagering game table during the capturing of the second image.

18. The method of claim 13, further comprising:

determining a player account for the wagering game player that is derived from the authenticate of the identification of the wagering game player; and assigning the wagering game play to the player account based on the identification of the wagering game player that is based on the first image of the at least three dimensions during the time of the touch of the wagering game player at the sensory area of the wagering game table and the second image of the at least three dimensions during the time of wagering game play.

19. A wagering game table comprising:

means for receiving, at an input device of the wagering game table, identification data that provides identification of a wagering game player as part of player authentication;

means for recognizing a touch of the wagering game player at a sensory area of the wagering game table during a time of player authentication;

means for creating player touch data in response to recognizing the touch of the wagering game player;

means for capturing a first image of at least three dimensions during a time of the touch of the wagering game player at the sensory area of the wagering game table, the first image comprising a first image of at least part of the sensory area of the wagering game table and a first image of at least part of the wagering game player;

means for associating the first image of the at least part of the wagering game player with the identification data of the wagering game player;

means for capturing a second image of at least three dimensions during a time of wagering game play, the second image comprising a second image of at least part of the sensory area of the wagering game table and a second image of at least part of the wagering game player that is performing a wagering game play at the wagering game table; and means for assigning the wagering game play to the identification of the wagering game player based on the identification data that provides the identification of the wagering game player as part of the player authentication at the input device and the second image of the at least three dimensions that is captured during the time of the wagering game play.

20. The wagering game table of claim 19, wherein the means for capturing the second image comprises means for capturing the second image with a first camera, wherein the wagering game table comprises:

means for capturing a third image of at least three dimensions with a second camera during the time of wagering game play, the third image of the at least three dimensions comprising a third image of at least part of the sensory area of the wagering game table and a third image of at least part of the wagering game player.

21. The wagering game table of claim 20, wherein the means for assigning of the wagering game play to the identification of the wagering game player is based on the third image of the at least three dimensions.

22. The wagering game table of claim 19, wherein the wagering game player is positioned on a first side of the wagering game table during capturing of the first image, and wherein the wagering game player is positioned on an opposite side relative to the first side of the wagering game table during capturing of the second image.

23. The wagering game table of claim 19, wherein the input device comprise a card reader device that is configured to receive a card having a magnetic strip, the card reader device configured to provide the identification of the wagering game player based on a scan of the magnetic strip.

24. The method of claim 19, further comprising:

means for determining a player account for the wagering game player that is derived from the authenticate of the identification of the wagering game player; and means for assigning the wagering game play to the player account based on the identification of the wagering game player that is based on the first image of the at least three dimensions during the time of the touch of the wagering game player at the sensory area of the wagering game table and the second image of the at least three dimensions during the time of wagering game play.

25. One or more machine-readable storage media, having instructions stored therein, which, when executed by a set of one or more processors cause the set of one or more processors to perform operations that comprise:

receiving, at an input device of a wagering game table, identification data that provides identification of a wagering game player as part of player authentication;

recognizing a touch of the wagering game player at a sensory area of the wagering game table during a time of player authentication;

creating player touch data in response to recognizing the touch of the wagering game player;

capturing a first image of at least three dimensions during a time of the touch of the wagering game player at the sensory area of the wagering game table, the first image comprising a first image of at least part of the sensory area of the wagering game table and a first image of at least part of the wagering game player;

associating the first image of the at least part of the wagering game player with the identification data of the wagering game player;

capturing a second image of at least three dimensions during a time of wagering game play, the second image comprising a second image of at least part of the sensory area of the wagering game table and a second image of at least part of the wagering game player that is performing a wagering game play at the wagering game table; and assigning the wagering game play to the identification of the wagering game player based on the identification data that provides identification of the wagering game player as part of the player authentication at the input device and the second image of the at least three dimensions that is captured during the time of the wagering game play.

26. The one or more machine-readable storage media of claim 25, wherein the input device comprise a card reader device that is configured to receive a card having a magnetic strip, the card reader device configured to provide the identification of the wagering game player based on a scan of the magnetic strip.

27. The one or more machine-readable storage media of claim 25, wherein capturing the second image comprises capturing the second image with a first camera, wherein the operations comprise:

capturing a third image of at least three dimensions with a second camera during the time of wagering game play, the third image of the at least three dimensions comprising a third image of at least part of the sensory area of the wagering game table and a third image of at least part of the wagering game player.

28. The one or more machine-readable storage media of claim 27, wherein the assigning of the wagering game play to the identification of the wagering game player is based on the third image of the at least three dimensions.

29. The one or more machine-readable storage media of claim 25, wherein the wagering game player is positioned on a first side of the wagering game table during the capturing of the first image, and wherein the wagering game player is positioned on an opposite side relative to the first side of the wagering game table during the capturing of the second image.

30. The one or more machine-readable storage media of claim 25, further comprising:

determining a player account for the wagering game player that is derived from the authenticate of the identification of the wagering game player; and assigning the wagering game play to the player account based on the identification of the wagering game player that is based on the first image of the at least three dimensions during the time of the touch of the wagering game player at the sensory area of the wagering game table and the second image of the at least three dimensions during the time of wagering game play.

* * * * *